(12) United States Patent
Zeng et al.

(10) Patent No.: US 7,912,137 B2
(45) Date of Patent: Mar. 22, 2011

(54) OFDMA DEVICE AND METHOD OF CORRECTING FREQUENCY OFFSET IN OFDMA SIGNALS

(75) Inventors: Chaohuang Zeng, Sunnyvale, CA (US); Won-Joon Choi, Cupertino, CA (US); Jingnong Yang, Santa Clara, CA (US)

(73) Assignee: Amicus Wireless Technology Ltd. (KY)

( * ) Notice: Subject to any disclaimer, the term of this patent is extended or adjusted under 35 U.S.C. 154(b) by 1046 days.

(21) Appl. No.: 11/621,953

(22) Filed: Jan. 10, 2007

(65) Prior Publication Data

US 2007/0160158 A1    Jul. 12, 2007

Related U.S. Application Data

(60) Provisional application No. 60/757,911, filed on Jan. 11, 2006, provisional application No. 60/757,909, filed on Jan. 11, 2006.

(51) Int. Cl.
*H04K 1/10*    (2006.01)
*H03K 9/00*    (2006.01)

(52) U.S. Cl. ........................................ 375/260; 375/316

(58) Field of Classification Search .................. 375/260, 375/259
See application file for complete search history.

(56) References Cited

U.S. PATENT DOCUMENTS

| | | | |
|---|---|---|---|
| 6,683,493 B1 | 1/2004 | Fujimora et al. | |
| 2004/0100898 A1* | 5/2004 | Anim-Appiah et al. | 370/210 |
| 2005/0078649 A1 | 4/2005 | Tehrani et al. | |
| 2005/0213679 A1 | 9/2005 | Yamagata | |
| 2006/0072586 A1 | 4/2006 | Callaway, Jr. et al. | |
| 2006/0093076 A1 | 5/2006 | Lee et al. | |
| 2006/0116095 A1* | 6/2006 | Henriksson | 455/223 |
| 2006/0133260 A1 | 6/2006 | Kim et al. | |
| 2006/0176802 A1 | 8/2006 | Ko et al. | |
| 2006/0233226 A1* | 10/2006 | Zhang | 375/149 |
| 2006/0233270 A1* | 10/2006 | Ahn et al. | 375/260 |
| 2007/0182604 A1* | 8/2007 | Aerts et al. | 341/118 |

* cited by examiner

*Primary Examiner* — David C Payne
*Assistant Examiner* — Brian J Stevens
(74) *Attorney, Agent, or Firm* — Thomas H. Ham; Wilson & Ham

(57) ABSTRACT

An Orthogonal Frequency Division Multiple Access (OFDMA) device and method of correcting frequency offset in OFDMA signals computes an estimated frequency offset, which is used for producing a frequency offset-compensated mixer signal using a reference clock signal. The frequency offset-compensated mixer signal is used to produce a digital down-converted signal from an incoming OFDMA signal. The digital down-converted signal is digitally corrected for sampling errors using the estimated frequency offset.

28 Claims, 4 Drawing Sheets

Sub-carrier Index (Frequency Index)

Page content from US 7,912,137 B2

OFDMA DEVICE AND METHOD OF CORRECTING FREQUENCY OFFSET IN OFDMA SIGNALS

CROSS REFERENCE TO RELATED APPLICATION

This application is entitled to the benefit of U.S. Provisional Patent Application Ser. No. 60/757,911 filed on Jan. 11, 2006 and 60/757,909 filed on Jan. 11, 2006, which are incorporated herein by reference.

BACKGROUND OF THE INVENTION

Orthogonal Frequency Division Multiple Access (OFDMA) technology is getting very popular in modern communication systems since the OFDMA technology can efficiently support multiple mobile stations with limited bandwidth and easily provide Quality of Service (QoS). The OFDMA technology is a multiple access version of orthogonal frequency-division multiplexing (OFDM). OFDM is a modulation technique for data transmission based on frequency-division multiplexing (FDM), which uses different frequency channels to transmit multiple streams of data. In OFDM systems, a wide channel is divided into multiple narrow-band sub-carriers, which allow orthogonal modulated streams of data to be transmitted in parallel on the sub-carriers.

In OFDMA systems, multiple subscribers can simultaneously use different sub-carriers for signal transmission. Thus, in an OFDMA system, multiple data bursts can be transmitted from a base station to multiple mobile stations in the same time frame but allocated in different frequency sub-carriers. Consequently, an OFDMA system can support multiple mobile stations using different sub-carriers.

In order to synchronize the transmitted data between the base station and the mobile stations, a local oscillator is used at each station to process the outgoing and incoming OFDMA signals. However, an OFDMA system is susceptible to frequency offset due to the oscillator mismatch between the base station and the mobile stations. Thus, it is necessary to determine the frequency offset and to compensate for the frequency offset when processing incoming and outgoing signals at each mobile station.

In view of this requirement, there is a need for an OFDMA device and method of correcting frequency offset in OFDMA signals.

SUMMARY OF THE INVENTION

An Orthogonal Frequency Division Multiple Access (OFDMA) device and method of correcting frequency offset in OFDMA signals computes an estimated frequency offset, which is used for mixing an incoming OFDMA signal with a frequency offset-compensated mixer signal and for digitally correcting sampling errors in the signal.

A method of correcting frequency offset in OFDMA signals in accordance with an embodiment of the invention comprises receiving an incoming OFDMA signal, computing an estimated frequency offset based on the incoming OFDMA signal, producing a frequency offset-compensated mixer signal using a reference clock signal and the estimated frequency offset, mixing the incoming OFDMA signal and the frequency offset-compensated mixer signal to produce a down-converted signal, converting the down-converted signal into a digital down-converted signal using the reference clock signal for sampling, the digital down-converted signal including sampling errors due to the reference clock signal, and digitally correcting the sampling errors in the digital down-converted signal using the estimated frequency offset.

An OFDMA device in accordance with an embodiment of the invention comprises a local oscillator configured to produce a reference clock signal, a frequency offset estimator configured to compute an estimated frequency offset based on an incoming OFDMA signal, a synthesizer configured to produce a frequency offset-compensated mixer signal using the reference clock signal and the estimated frequency offset, a mixer configured to down convert the incoming OFDMA signal with respect to frequency using the frequency offset-compensated mixer signal to produce a down-converted signal, an analog-to-digital converter configured to convert the down-converted signal into a digital down-converted signal using the reference clock signal for sampling, the digital down-converted signal including sampling errors due to the reference clock signal, and a digital frequency offset corrector configured to correct the sampling errors in the digital down-converted signal using the estimated frequency offset.

A method of correcting frequency offset in OFDMA signals in accordance with another embodiment of the invention comprises receiving an incoming OFDMA signal, computing an estimated phase difference between signal values in different slots of a preamble of the incoming OFDMA signal, deriving an estimated frequency offset using the estimated phase difference in a phase difference equation, the phase difference equation defining a relationship between the estimated phase difference and the estimated frequency offset and correcting errors introduced into the incoming OFDMA signal during processing of the incoming OFDMA signal using the estimated frequency offset.

Other aspects and advantages of the present invention will become apparent from the following detailed description, taken in conjunction with the accompanying drawings, illustrated by way of example of the principles of the invention.

DETAILED DESCRIPTION

Figure 1:
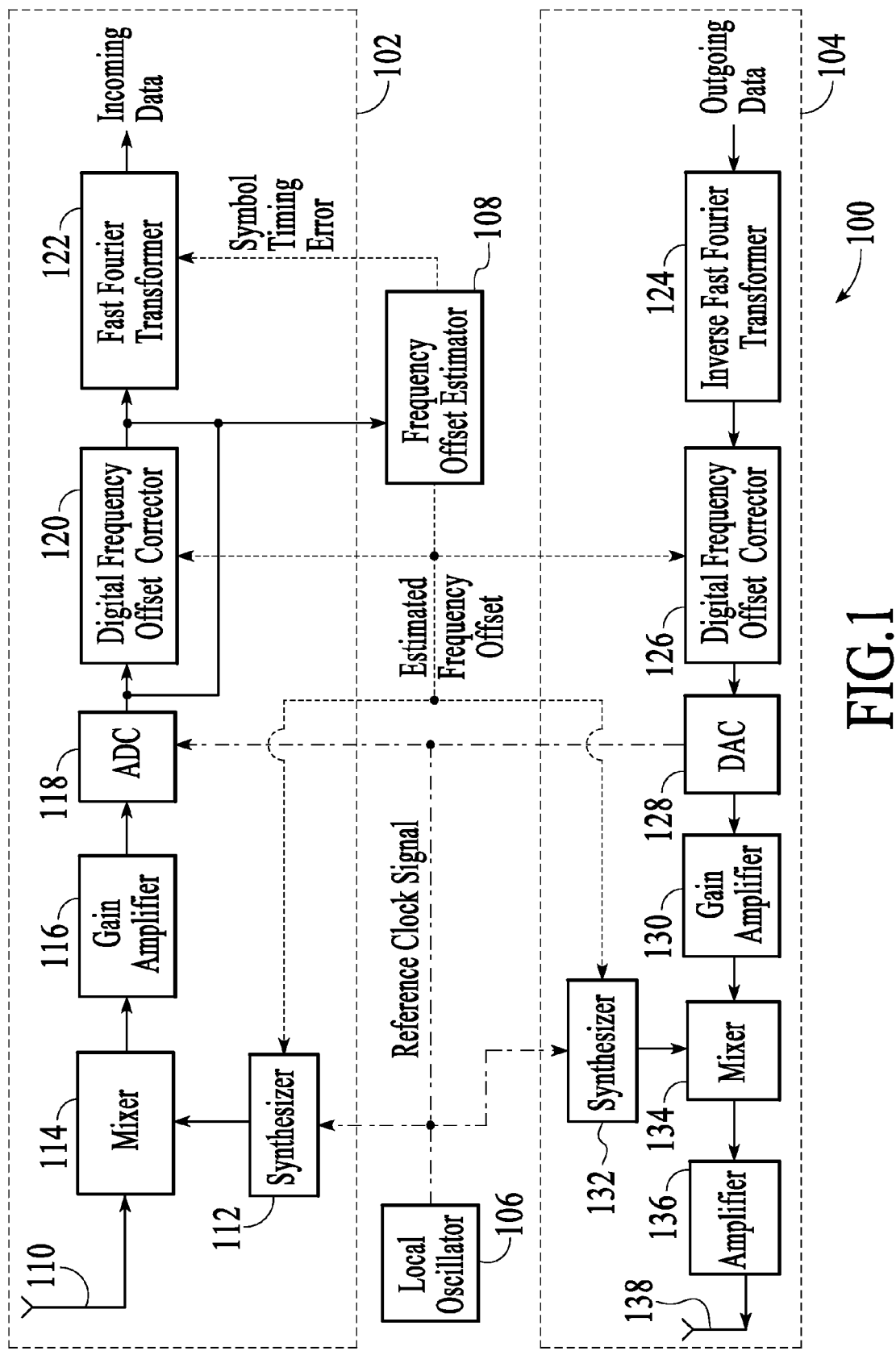
FIG. 1 is a block diagram of an Orthogonal Frequency Division Multiple Access (OFDMA) device in accordance with an embodiment of the invention.

With reference to FIG. 1, an Orthogonal Frequency Division Multiple Access (OFDMA) device 100 in accordance with an embodiment of the invention is described. In this embodiment, the OFDMA device is a mobile station of an OFDMA system that receives incoming OFDMA signals from a base station of the system and transmits outgoing OFDMA signals to the base station. As described in more detail below, the OFDMA device 100 is configured to estimate the frequency offset with respect to the base station using the incoming OFDMA signals and then to apply the estimated frequency offset in both analog and digital domains to correct for synchronization errors due to the frequency offset.

As shown in FIG. 1, the OFDMA device 100 includes a receiver 102, a transmitter 104, a local oscillator 106 and a frequency offset estimator 108. The receiver 102 operates to receive incoming OFDMA signals from the base station and then to process the received signals to extract the data embedded in the signals. The transmitter 104 operates to process data to produce outgoing OFDMA signals and then to transmit the signals to the base station. The local oscillator 106 is configured to generate a reference clock signal, which is used in the receiver 102 and the transmitter 104. The frequency offset estimator 108 operates to produce an estimated frequency offset signal, which is used at the receiver 102 and the transmitter 104 to correct for synchronization errors due to frequency offset in the incoming and outgoing signals.

The frequency offset estimator 108 is configured to compute an estimated frequency offset in a frame of an incoming OFDMA signal. This estimated frequency offset signal can then be used to correct the frequency offset in one or more subsequent frames of the incoming OFDMA signal. The frequency offset estimator 108 is configured to estimate the frequency offset in the frame of the incoming OFDMA signal by first estimating a fine frequency offset in the time domain and then estimating a coarse frequency offset in the frequency domain. The estimated coarse frequency offset is used to correct a large frequency offset, which is not corrected using the estimated fine frequency offset. In some embodiments, the estimated coarse frequency offset is not needed, and thus, is not computed by the frequency offset estimator 108. In these embodiments, the estimated frequency offset computed by the frequency offset estimator 108 includes only the estimated fine frequency offset. In other embodiments, the estimated frequency offset computed by the frequency offset estimator 108 includes both the estimated fine frequency offset and the estimated coarse frequency offset.

Figure 2:
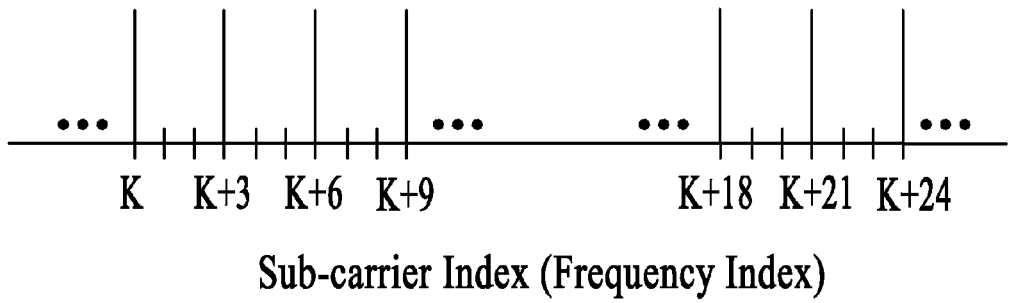
FIG. 2 is a diagram of a preamble of an OFDMA signal in the frequency domain.
Figure 3:
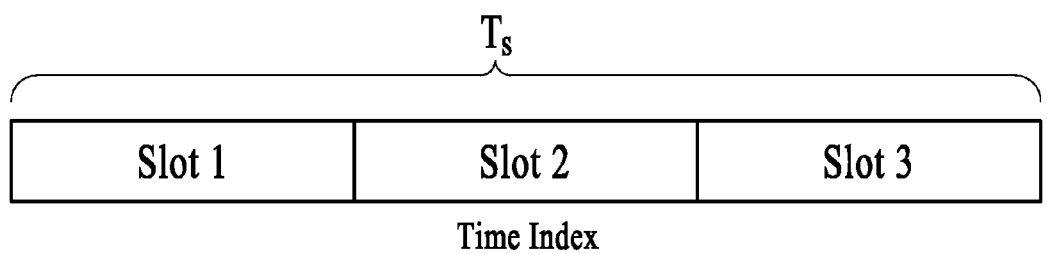
FIG. 3 is a diagram of a preamble of an OFDMA signal in the time domain.

OFDMA signals include preamble symbols (hereinafter "preamble"), which are predefined repetitive sequences. In the frequency domain, a preamble has non-zero in every third sub-carrier from the starting sub-carrier to the ending sub-carrier, as shown in FIG. 2. In the time domain, the preamble symbol can be divided into three slots: slot 1, slot 2 and slot 3, as shown in FIG. 3. Each slot occupies one-third of the preamble length. In the ideal case of no frequency offset, i.e., in the absence of frequency offset, the three slots are identical except for a known phase difference between the slots, which can be corrected in either time or frequency domain. In the presence of frequency offset, the received signals in the three slots are no longer the same. The phase difference between slot 1 and slot 2 of the preamble (assuming that the known phase difference is zero) is defined by the following equation:

$$\varphi_1(i) = 2\pi f_o \frac{T_S}{3} + n(i), \quad \text{(Equation 1)}$$

where $\phi$ is the phase difference, $f_o$ is the frequency offset, $T_S$ is the preamble period, i is the sample index in the slot, and n(i) is the noise in the system. Thus, this phase difference equation defines a relationship between the phase difference and the frequency offset. The phase difference between slot 1 and slot 3 of the preamble (assuming that the known phase difference is zero) is defined by the following equation:

$$\varphi_2(i) = 2\pi f_o \frac{T_S}{3} + n_2(i), \quad \text{(Equation 2)}$$

where $\phi$ is the phase difference, $f_o$ is the frequency offset, $T_S$ is the preamble period, i is the sample index in the slot, and $n_2(i)$ is the noise in the system.

A method of estimating a fine frequency offset in accordance with an embodiment of the invention, which is executed by the frequency offset estimator 108, is now described. First, the phase difference between slot 1 and slot 2 is estimated by determining the angle of a z value (self-correlation value), where z is defined by the following equation:

$$z = \sum_{i=0}^{N-1} y_{i+N} \cdot y_i^*, \quad \text{(Equation 3)}$$

where N is the number of sampled signal values in each of the slots of the preamble, $y_{i+N}$ is a signal value in slot 2 and $y_i^*$ is the conjugate of a signal value in slot 1. After the phase difference is estimated, the frequency offset $f_o$ is derived using Equation 1. Since many sampled values were used to compute the estimated phase difference, the noise term n(i) can be assumed to be zero. The derived frequency offset $f_o$ is an estimated fine frequency offset in the received signal.

A method of estimating a fine frequency offset in accordance with an alternative embodiment of the invention, which is executed by the frequency offset estimator 108, is now described. In this embodiment, the phase difference between slot 1 and slot 2, and the phase difference between slot 1 and slot 3 are estimated using Equation 3 with the appropriate sampled values in the slots. That is, the angle of self-correlation value for slot 1 and slot 2 is computed to estimate the phase difference between slot 1 and slot 2, and the angle of self-correlation value for slot 1 and slot 3 is computed to estimate the phase difference between slot 1 and slot 3. For the phase difference between slot 1 and slot 3, $y_{i+N}$ is a signal value in slot 3 and $y_i^*$ is the conjugate of a signal value in slot 1. After the phase differences are estimated, the frequency offset $f_o$ is determined using the estimated phase difference between slot 1 and slot 2, the estimated phase difference between slot 1 and slot 3, Equation 1 and Equation 2. Again, since many sampled values were used to compute the estimated phase differences, the noise term n(i) in Equation 1 and the noise term $n_2(i)$ in Equation 2 can both be assumed to be zero. The derived frequency offset $f_o$ is the estimated fine frequency offset in the received signal.

A method of estimating a fine frequency offset in accordance with another alternative embodiment of the invention, which is executed by the frequency offset estimator 108, is now described. In this embodiment, the self-correlation value for slot 1 and slot 2 and the self-correlation value for slot 1 and 3 are computed using Equation 3. Next, the product of the two self-correlation values is computed. Next, the angle of the product is computed to estimate the phase difference. After the phase difference is estimated, the frequency offset $f_o$ is determined using Equation 1 or Equation 2. Again, since many sampled values were used to compute the estimated phase difference, the noise term n(i) in Equation 1 or the noise term $n_2(i)$ in Equation 2 can be assumed to be zero. The derived frequency offset $f_o$ is the estimated fine frequency offset in the received signal.

The methods described above estimate only the fine frequency offset because the phase difference value ranges from $-\pi$ to $+\pi$. A phase difference value beyond this range is wrapped around, which creates ambiguity in estimating a large frequency offset. For example, the frequency offsets $f_o$ and $f_o+3/T_S$ are not distinguishable using the methods above. In order to resolve this ambiguity, the frequency offset estimator 108 may be configured to also estimate a coarse frequency offset.

Figure 4:
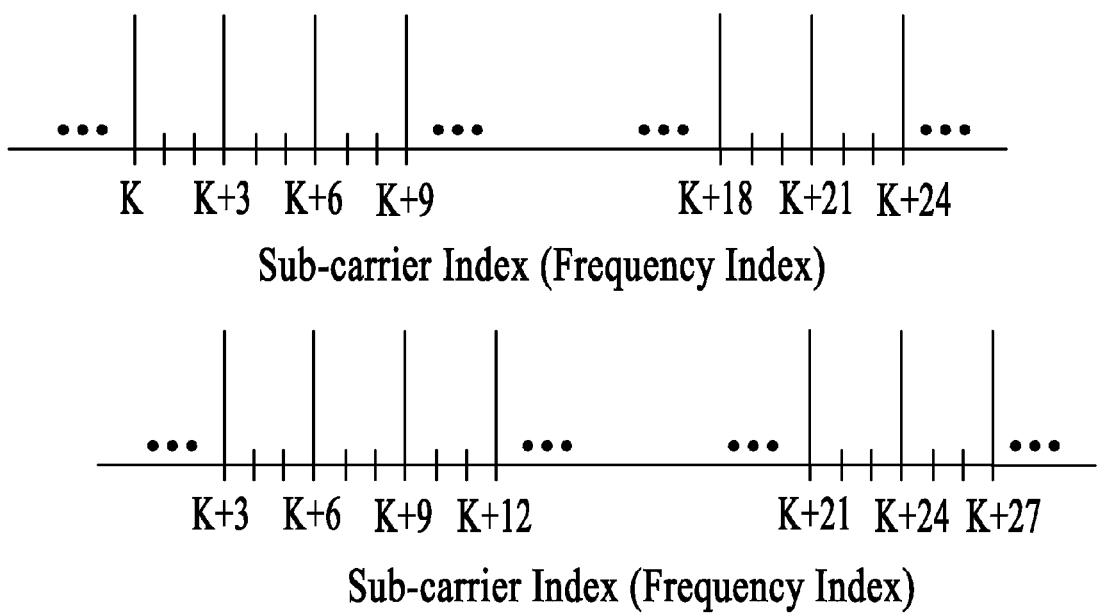
FIG. 4 is a diagram of a signal shifted by an integer multiple of sub-carrier spacing from the original position.

After the fine frequency offset is estimated and corrected, there is little or no inter-carrier interference in the frequency domain. In other words, the signal is now aligned in the frequency grid (sub-carrier). However, because of a large frequency offset, the signal can be shifted by an integer multiple of sub-carrier spacing from the original position. This is illustrated in FIG. 4, where the lower signal is shifted by three sub-carriers. This sub-carrier shift is determined as an estimated coarse frequency offset by the frequency offset estimator 108.

A method of estimating a coarse frequency offset in accordance with an embodiment of the invention, which is executed by the frequency offset estimator 108, is now described. First, the frequency offset range, i.e., the sub-carrier offset range, is determined. The frequency offset range is a known parameter provided by the manufacturer of the local oscillator 106. For each sub-carrier offset within the frequency offset range, the following steps are executed. A reference preamble is shifted by this offset and cross-correlated with the preamble of the adjusted received signal, which has been corrected for fine frequency offset. Next, the value in sub-carrier i+3 is multiplied with the conjugate value in sub-carrier i, where i represents the position in which the shifted preamble is not equal to zero. This step is known as self-correlation. Next, all the values produced by self-correlation are added together to derive a total self-correlation value for this particular offset. After the received signal has been processed for each offset within the frequency offset range, the largest self-correlation value from all the self-correction values is selected. The frequency offset that corresponds to this largest self-correction value is determined to be the estimated coarse frequency offset.

The frequency offset estimator 108 produces the final estimated frequency offset using the estimated fine frequency offset and the estimated coarse frequency offset, which were derived using a single frame of the received signal. In some embodiments, the estimated frequency offset can be averaged over many different frames of the received signal by the frequency offset estimator 108 to produce a more accurate estimated frequency offset.

The frequency offset estimator 108 is also configured to estimate symbol timing offset. In order to properly process an OFDMA symbol, the boundary of the OFDMA symbol needs to be accurately determined. If the symbol boundary is incorrectly determined, a portion of the OFDMA symbol may not be properly processed. If there is no symbol timing offset, then there is also no linear phase error in each sub-carrier. However, if there is symbol timing offset, then there is a linear phase error. Thus, the linear phase error can be used to determine and correct the symbol timing offset. This linear phase error can be estimated using the phase difference associated with the largest self-correlation value, which was determined during the estimation of the coarse frequency offset. This phase difference can then be used to determine the symbol timing error so that proper symbol boundary can also be determined.

Turning back to FIG. 1, the components of the receiver 102 are now described. As shown in FIG. 1, the receiver 102 includes a receiving antenna 110, a synthesizer 112, a mixer 114, a gain amplifier 116, an analog-to-digital converter (ADC) 118, a digital frequency offset corrector 120 and a fast Fourier transformer 122. The receiver 102 further includes other components commonly found in an OFDMA receiver. However, these other components are not described herein so that the inventive features of the invention are not obscured.

The synthesizer 112 is connected to the local oscillator 106 to receive the reference clock signal. The synthesizer 112 is also connected to the frequency offset estimator 108 to receive the estimated frequency offset in the form of a signal. The estimated frequency offset from the frequency offset estimator 108 is used to compensate for the frequency offset between the reference clock signal of the local oscillator 106 and the clock signal used at the transmitting base station. The synthesizer 112 is configured to adjust the resulting mixer signal using the estimated frequency offset signal to compensate for the frequency offset of the reference clock signal. As an example, the synthesizer 112 may use a fractional phase lock loop to produce a frequency offset-compensated mixer signal. However, other known techniques may be utilized to produce the frequency offset-compensated mixer signal using the reference clock signal and the estimated frequency offset signal.

The receiving antenna 110 is used to receive an incoming OFDMA signal from the base station. The mixer 114 is configured to mix the received incoming OFDMA signal with the frequency offset-compensated mixer signal from the synthesizer 112 to down convert the frequency of the incoming OFDMA signal to the baseband frequency. The gain amplifier 16 is configured to amplify the down-converted signal. The ADC 118 is configured to convert the amplified down-converted signal from an analog signal into a digital signal. The ADC 118 is connected to the local oscillator 106 to receive the reference clock signal, which is used as the sampling clock signal for converting the down-converted signal into a digital signal. Since the reference clock signal from the local oscillator 106 is not corrected for frequency offset, the resulting digital signal includes sampling errors due to the frequency offset of the reference clock signal.

The digital frequency offset corrector 120 operates to receive the digital down-converted signal from the ADC 118 and correct the sampling errors in the digital down-converted signal using the estimated frequency offset from the frequency offset estimator 108. In an embodiment, the digital frequency offset corrector 120 is connected to the ADC 118 and positioned before the fast Fourier transformer 122, as illustrated in FIG. 1. Thus, in this embodiment, the digital frequency offset corrector 120 operates in the time domain. In this embodiment, the digital frequency offset corrector 120 is configured to digitally resample the digital down-converted signal at a frequency offset-compensated sampling rate (i.e., frequency of the reference clock signal without frequency offset), which is derived using the estimated frequency offset signal from the frequency offset estimator 108, so that the sampling errors can be corrected.

In this embodiment, the fast Fourier transformer 122 is connected to the digital frequency offset corrector 120 to receive the sampling error-corrected signal. The fast Fourier transformer 122 is configured to perform fast Fourier transform on the OFDMA symbols in the received signal. The fast Fourier transformer 122 is also connected to the frequency offset estimator 108 to receive a signal, which includes the estimated symbol timing error. The estimate symbol timing error is used by the fast Fourier transformer 122 to determine the boundaries of the OFDMA symbols to properly convert the OFDMA symbols into frequency components, which are further processed to extract the data in the received signal.

In another embodiment, the digital frequency offset corrector 120 is positioned after the fast Fourier transformer 122. Thus, in this embodiment, the digital frequency offset corrector 120 operates in the frequency domain. In this embodiment, the digital frequency offset corrector 120 is configured to correct linear phase shift from one OFDMA symbol to another. The linear phase shift is caused by the sampling errors introduced into the digital down-converted signal at the ADC 118 due to the reference clock signal from the local oscillator 106. Using the estimated frequency offset signal from the frequency offset estimator 108, the digital frequency offset corrector 120 is configured to calculate the sampling time error. The linear phase shift can then be calculated from the sampling time error and be corrected by the digital frequency offset corrector 120.

In the illustrated embodiment, the frequency offset estimator 108 is connected to the receiving signal path at a node between the ADC 118 and the frequency offset corrector 120 to retrieve a frame of the incoming signal for estimating the fine frequency offset. The frequency offset estimator 108 is also connected to the receiving signal path at a node after the frequency offset corrector 120 to retrieve the frame of the incoming signal after the frame has been corrected for fine frequency offset for estimating the coarse frequency offset.

The transmitter 104 of the OFDMA device 100 includes an inverse fast Fourier transformer 124, a digital frequency offset corrector 126, a digital-to-analog converter (DAC) 128, a gain amplifier 130, a synthesizer 132, a mixer 134, an amplifier 136 and a transmitting antenna 138. The inverse fast Fourier transformer 124 receives data to be transmitted and transforms the data from frequency components into time domain waveform, thereby converting the data from the frequency domain into the time domain.

The digital frequency offset corrector 126 is connected to the inverse fast Fourier transformer 124 to receive the time domain waveform, which is a digital outgoing OFDMA signal. The digital frequency offset corrector 126 is also connected to the frequency offset estimator 108 to receive a signal containing the estimated frequency offset. The digital frequency offset corrector 126 operates to digitally resample the digital outgoing signal at the correct sampling rate using the estimated frequency offset in anticipation of sampling errors that will be introduced at the DAC 128.

The DAC 128 is connected to the digital frequency offset corrector 126 to receive the digital outgoing signal, which has now been corrected in anticipation of sampling errors. The DAC 128 is also connected to the local oscillator 106 to receive the reference clock signal. The DAC 128 converts the digital outgoing signal into an analog signal using the reference clock signal as the sampling clock signal. The resulting analog signal is then amplified by the gain amplifier 130 and transmitted to the mixer 134.

The mixer 134 is connected to the gain amplifier 130 to receive the analog outgoing signal. The mixer 134 operates to mix the analog outgoing signal with a frequency offset-compensated mixer signal to up convert the analog outgoing signal for wireless transmission. In an embodiment, the mixer 134 is connected to the synthesizer 132 to receive the frequency offset-compensated mixer signal. Similar to the synthesizer 112 of the receiver 102, the synthesizer 132 is connected to the local oscillator 106 to receive the reference clock signal, which is used to produce the mixer signal. The synthesizer 132 is also connected to the frequency offset estimator 108 to receive the estimated frequency offset signal, which is used to compensate for the frequency offset. As an example, the synthesizer 132 may use a fractional phase lock loop to produce the frequency offset-compensated mixer signal. However, other known techniques may be utilized to produce the frequency offset-compensated mixer signal using the reference clock signal and the estimated frequency offset signal.

In an alternative embodiment, the mixer 134 may be connected to the synthesizer 112 of the receiver 102 to receive the frequency offset-compensated mixer signal from that synthesizer. In this embodiment, the synthesizer 132 is not needed, and thus, can be removed from the OFDMA device 100.

The up-converted outgoing signal is then amplified by the amplifier 136 and transmitted via the transmitting antenna 138. In an alternative embodiment, the outgoing signal is transmitted using the antenna 110, which is used to both receive and transmit OFDMA signals. In this embodiment, the transmitting antenna 138 is not needed, and thus, can be removed from the OFDMA device 100.

Various components of the OFDMA device 100 represent functional blocks that can be implemented in any combination of software, hardware and firmware. In addition, some of these components of the OFDMA device 100 may be combined or divided so the OFDMA device includes fewer or more components than described and illustrated herein.

Figure 5:
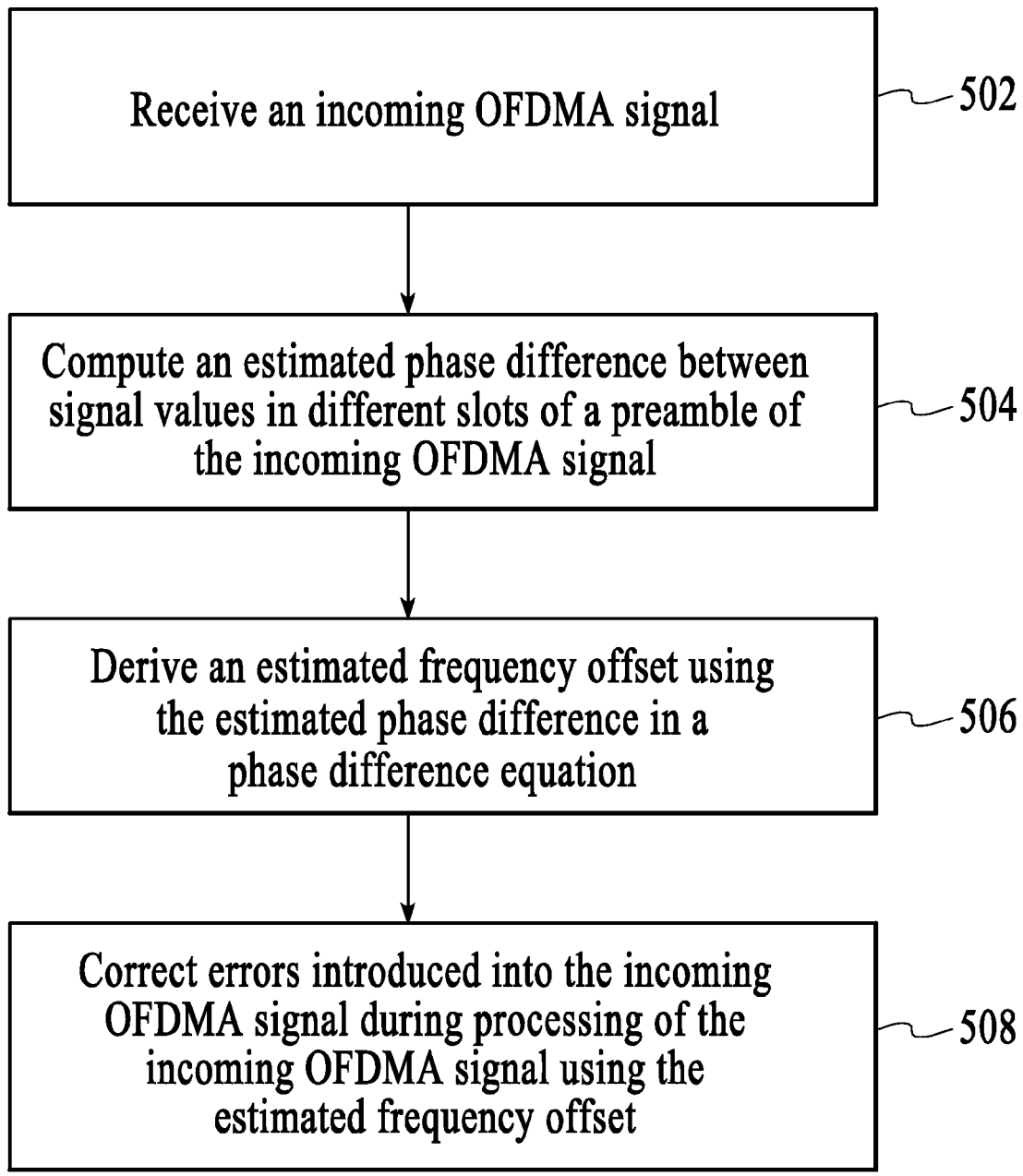
FIG. 5 is a flow diagram of a method of correcting frequency offset in OFDMA signals in accordance with an embodiment of the invention.

A method of correcting frequency offset in OFDMA signals in accordance with an embodiment of the invention is described with reference to a flow diagram of FIG. 5. At block 502, an incoming OFDMA signal is received. Next, at block 504, an estimated phase difference between signal values in different slots of a preamble of the incoming OFDMA signal is computed. Next, at block 506, an estimated frequency offset is derived using the estimated phase difference in a phase difference equation, which defines a relationship between the phase difference and the estimated frequency offset. Next, at block 508, errors introduced into the incoming OFDMA signal during processing of the incoming OFDMA signal are corrected using the estimated frequency offset.

Figure 6:
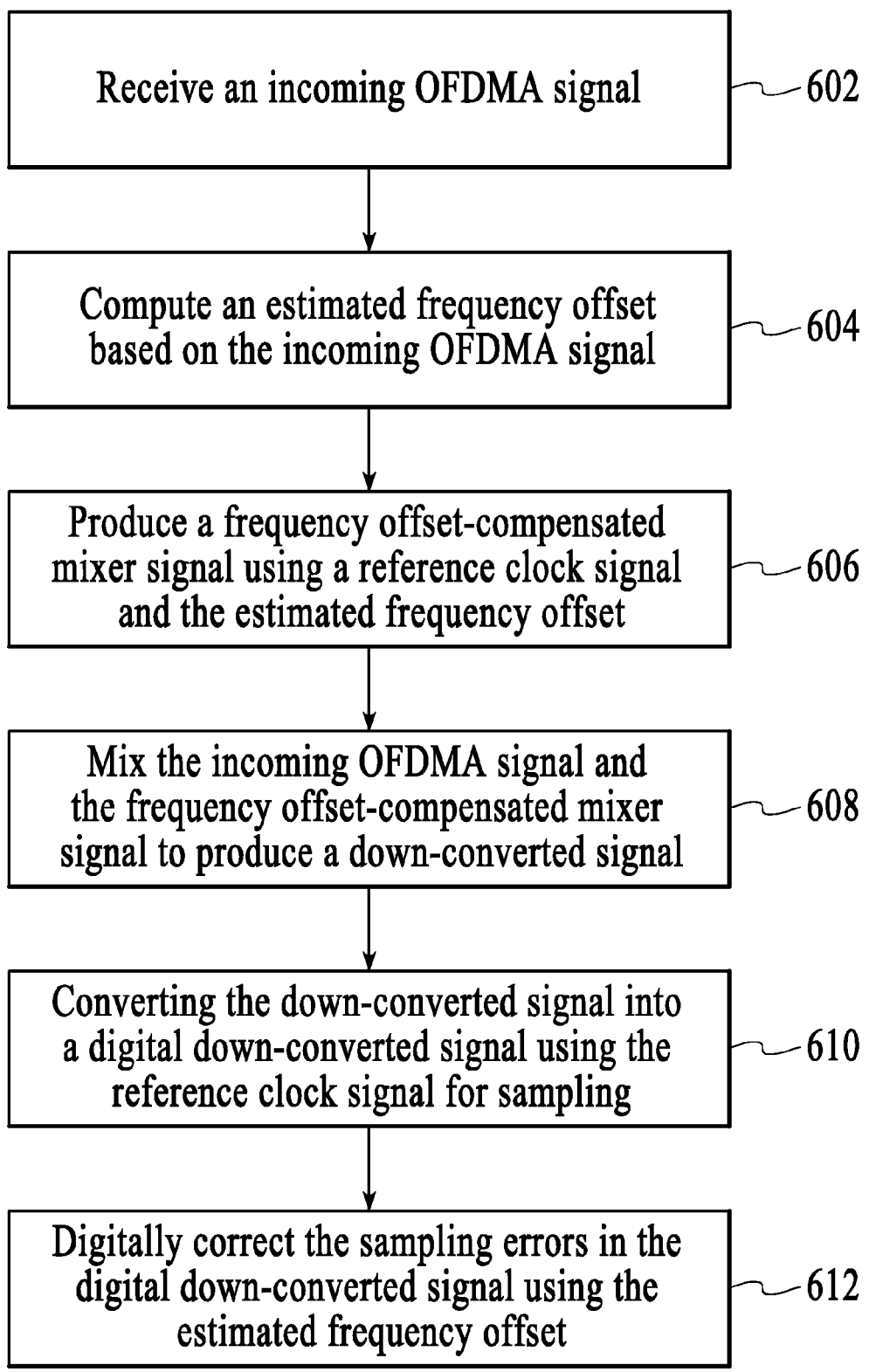
FIG. 6 is a flow diagram of a method of correcting frequency offset in OFDMA signals in accordance with another embodiment of the invention.

A method of correcting frequency offset in OFDMA signals in accordance with another embodiment of the invention is described with reference to a flow diagram of FIG. 6. At block 602, an incoming OFDMA signal is received. Next, at block 604, an estimated frequency offset is computed based on the incoming OFDMA signal. Next, at block 606, a frequency offset-compensated mixer signal is produced using a reference clock signal and the estimated frequency offset. Next, at block 608, the incoming OFDMA signal and the frequency offset-compensated mixer signal are mixed to produce a down-converter signal. Next, at block 610, the down-converted signal is converted into a digital down-converted signal using the reference clock signal for sampling. The digital down-converted signal includes sampling errors due to the reference clock signal. Next, at block 612, the sampling errors in the digital down-converted signal are digitally corrected using the estimated frequency offset.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method of correcting frequency offset in Orthogonal Frequency Division Multiple Access (OFDMA) signals, said method comprising:

receiving an incoming OFDMA signal at an OFDMA device;

computing an estimated frequency offset based on said incoming OFDMA signal at said OFDMA device, wherein said computing said estimated frequency offset includes computing an estimated phase difference between signal values in different slots of a preamble of said incoming OFDMA signal and deriving said estimated frequency offset using said estimated phase difference in a phase difference equation, said phase difference equation defining a relationship between said estimated phase difference and said estimated frequency offset;

producing a frequency offset-compensated mixer signal by synthesis of a reference clock signal and said estimated frequency offset at said OFDMA device;

mixing said incoming OFDMA signal and said frequency offset-compensated mixer signal to produce a down-converted signal at said OFDMA device;

converting said down-converted signal into a digital down-converted signal using said reference clock signal for sampling, said digital down-converted signal including sampling errors due to said reference clock signal at said OFDMA device;

digitally correcting said sampling errors in said digital down-converted signal using said estimated frequency offset at said OFDMA device; and computing an estimated symbol timing offset using said estimated phase difference.

2. The method of claim 1 wherein said digitally correcting includes digitally resampling said digital down-converted signal at a frequency offset-compensated sampling rate derived using said estimated frequency offset.

3. The method of claim 1 wherein said digitally correcting includes compensating for a linear phase shift of symbols in said digital down-converted signal, said linear phase shift of symbols being caused by said sampling errors.

4. A method of correcting frequency offset in Orthogonal Frequency Division Multiple Access (OFDMA) signals, said method comprising:

receiving an incoming OFDMA signal at an OFDMA device;

computing an estimated frequency offset based on said incoming OFDMA signal at said OFDMA device, wherein said computing said estimated frequency offset includes computing an estimated phase difference between signal values in different slots of a preamble of said incoming OFDMA signal and deriving said estimated frequency offset using said estimated phase difference in a phase difference equation, said phase difference equation defining a relationship between said estimated phase difference and said estimated frequency offset;

producing a frequency offset-compensated mixer signal by synthesis of a reference clock signal and said estimated frequency offset at said OFDMA device;

mixing said incoming OFDMA signal and said frequency offset-compensated mixer signal to produce a down-converted signal at said OFDMA device;

converting said down-converted signal into a digital down-converted signal using said reference clock signal for sampling, said digital down-converted signal including sampling errors due to said reference clock signal at said OFDMA device; and digitally correcting said sampling errors in said digital down-converted signal using said estimated frequency offset at said OFDMA device, wherein said computing said estimated phase difference includes:

computing a self-correlation z value using the following equation:

$$z = \sum_{i=0}^{N-1} y_{i+N} \cdot y_i^*,$$

where N is the number of signal values in said different slots of said preamble, $y_{i+N}$ is a signal value in one of said different slots of said preamble and $y_i^*$ is the conjugate of a signal value in another slot of said preamble; and computing the angle of said z value to derive said estimated phase difference.

5. The method of claim 4 wherein said another slot is the first slot of said preamble of said incoming OFDMA signal and said one of said different slots is the second or third slot of said preamble of said incoming OFDMA signal.

6. A method of correcting frequency offset in Orthogonal Frequency Division Multiple Access (OFDMA) signals, said method comprising:

receiving an incoming OFDMA signal at an OFDMA device;

computing an estimated frequency offset based on said incoming OFDMA signal at said OFDMA device, wherein said computing said estimated frequency offset includes computing an estimated phase difference between signal values in different slots of a preamble of said incoming OFDMA signal and deriving said estimated frequency offset using said estimated phase difference in a phase difference equation, said phase difference equation defining a relationship between said estimated phase difference and said estimated frequency offset;

producing a frequency offset-compensated mixer signal by synthesis of a reference clock signal and said estimated frequency offset at said OFDMA device;

mixing said incoming OFDMA signal and said frequency offset-compensated mixer signal to produce a down-converted signal at said OFDMA device;

converting said down-converted signal into a digital down-converted signal using said reference clock signal for sampling, said digital down-converted signal including sampling errors due to said reference clock signal at said OFDMA device; and digitally correcting said sampling errors in said digital down-converted signal using said estimated frequency offset at said OFDMA device, wherein said phase difference equation to derive said estimated frequency offset is:

$\phi = A\pi f_o T_S$, where A is a constant, $\phi$ is said estimated phase difference, $f_o$ is said estimated frequency offset and $T_S$ is the preamble period.

7. A method of correcting frequency offset in Orthogonal Frequency Division Multiple Access (OFDMA) signals, said method comprising:

receiving an incoming OFDMA signal at an OFDMA device;

computing an estimated frequency offset based on said incoming OFDMA signal at said OFDMA device;

producing a frequency offset-compensated mixer signal by synthesis of a reference clock signal and said estimated frequency offset at said OFDMA device;

mixing said incoming OFDMA signal and said frequency offset-compensated mixer signal to produce a down-converted signal at said OFDMA device;

converting said down-converted signal into a digital down-converted signal using said reference clock signal for sampling, said digital down-converted signal including sampling errors due to said reference clock signal at said OFDMA device; and digitally correcting said sampling errors in said digital down-converted signal using said estimated frequency offset at said OFDMA device, wherein said computing said estimated frequency offset includes:

computing the angle of a first self-correlation value for the first slot and the second slot of a preamble of said incoming OFDMA signal to derive a first estimated phase difference;

computing the angle of a second self-correlation value for said first slot and the third slot of said preamble to derive a second estimated phase difference; and deriving said estimated frequency offset using said first and second estimated phase differences in at least one phase difference equation, said phase difference equation defining a relationship between at least one of said first and second estimated phase differences and said estimated frequency offset.

8. A method of correcting frequency offset in Orthogonal Frequency Division Multiple Access (OFDMA) signals, said method comprising:

receiving an incoming OFDMA signal at an OFDMA device;

computing an estimated frequency offset based on said incoming OFDMA signal at said OFDMA device;

producing a frequency offset-compensated mixer signal by synthesis of a reference clock signal and said estimated frequency offset at said OFDMA device;

mixing said incoming OFDMA signal and said frequency offset-compensated mixer signal to produce a down-converted signal at said OFDMA device;

converting said down-converted signal into a digital down-converted signal using said reference clock signal for sampling, said digital down-converted signal including sampling errors due to said reference clock signal at said OFDMA device; and digitally correcting said sampling errors in said digital down-converted signal using said estimated frequency offset at said OFDMA device, wherein said computing said estimated frequency offset includes:

computing a first self-correlation value for the first slot and the second slot of a preamble of said incoming OFDMA signal;

computing a second self-correlation value for said first slot and the third slot of said preamble;

computing the product of said first and second self-correlation values;

computing the angle of said product of said first and second self-correlation values to derive an estimated phase difference; and deriving said estimated frequency offset using said estimated phase difference in a phase difference equation, said phase difference equation defining a relationship between said estimated phase difference and said estimated frequency offset.

9. A method of correcting frequency offset in Orthogonal Frequency Division Multiple Access (OFDMA) signals, said method comprising:

receiving an incoming OFDMA signal at an OFDMA device;

computing an estimated frequency offset based on said incoming OFDMA signal at said OFDMA device;

producing a frequency offset-compensated mixer signal by synthesis of a reference clock signal and said estimated frequency offset at said OFDMA device;

mixing said incoming OFDMA signal and said frequency offset-compensated mixer signal to produce a down-converted signal at said OFDMA device;

converting said down-converted signal into a digital down-converted signal using said reference clock signal for sampling, said digital down-converted signal including sampling errors due to said reference clock signal at said OFDMA device; and digitally correcting said sampling errors in said digital down-converted signal using said estimated frequency offset at said OFDMA device, wherein said computing said estimated frequency offset includes:

cross-correlating a preamble of said incoming OFDMA signal with a reference preamble at different offset shifts to produce cross-correlated signals;

self-correlating each of said cross-correlated signals to derive self-correlation values; and selecting an offset shift that correspond to the largest value of said self-correlation values to derive an estimated coarse frequency offset of said estimated frequency offset.

10. A method of correcting frequency offset in Orthogonal Frequency Division Multiple Access (OFDMA) signals, said method comprising:

receiving an incoming OFDMA signal at an OFDMA device;

computing an estimated frequency offset based on said incoming OFDMA signal at said OFDMA device;

producing a frequency offset-compensated mixer signal by synthesis of a reference clock signal and said estimated frequency offset at said OFDMA device;

mixing said incoming OFDMA signal and said frequency offset-compensated mixer signal to produce a down-converted signal at said OFDMA device;

converting said down-converted signal into a digital down-converted signal using said reference clock signal for sampling, said digital down-converted signal including sampling errors due to said reference clock signal at said OFDMA device;

digitally correcting said sampling errors in said digital down-converted signal using said estimated frequency offset at said OFDMA device, digitally correcting a digital outgoing signal using said estimated frequency offset in anticipation of digital-to-analog sampling errors;

converting said digital outgoing signal into an analog outgoing signal using said reference clock signal for sampling; and mixing said analog outgoing signal and one of said frequency offset-compensated mixer signal and a different frequency offset-compensated mixer signal to produce an up-converted signal.

11. The method of claim 10 wherein said digitally correcting includes digitally resampling said digital outgoing signal at a frequency offset-compensated sampling rate derived using said estimated frequency offset.

12. An Orthogonal Frequency Division Multiple Access (OFDMA) device comprising:

a local oscillator configured to produce a reference clock signal;

a frequency offset estimator configured to compute an estimated frequency offset based on an incoming OFDMA signal, wherein said frequency offset estimator is configured to compute an estimated phase difference between signal values in different slots of a preamble of said incoming OFDMA signal and to derive said estimated frequency offset using said estimate phase difference in a phase difference equation, said phase difference equation defining a relationship between said estimated phase difference and said estimated frequency offset, wherein said frequency offset estimator is configured to compute an estimated symbol timing offset using said estimated phase difference;

a synthesizer configured to produce a frequency offset-compensated mixer signal using said reference clock signal and said estimated frequency offset;

a mixer configured to down convert said incoming OFDMA signal with respect to frequency using said frequency offset-compensated mixer signal to produce a down-converted signal;

an analog-to-digital converter configured to convert said down-converted signal into a digital down-converted signal using said reference clock signal for sampling, said digital down-converted signal including sampling errors due to said reference clock signal; and a digital frequency offset corrector configured to correct said sampling errors in said digital down-converted signal using said estimated frequency offset.

13. The device of claim 12 wherein said digital frequency offset corrector is configured to digitally resample said digital down-converted signal at a frequency offset-compensated sampling rate derived using said estimated frequency offset.

14. The device of claim 12 wherein said frequency offset corrector is configured to compensate for a linear phase shift of symbols in said down-converted signal, said linear phase shift of symbols being caused by said sampling errors.

15. An Orthogonal Frequency Division Multiple Access (OFDMA) device comprising:

a local oscillator configured to produce a reference clock signal;

a frequency offset estimator configured to compute an estimated frequency offset based on an incoming OFDMA signal, wherein said frequency offset estimator is configured to compute an estimated phase difference between signal values in different slots of a preamble of said incoming OFDMA signal and to derive said estimated frequency offset using said estimate phase difference in a phase difference equation, said phase difference equation defining a relationship between said estimated phase difference and said estimated frequency offset;

a synthesizer configured to produce a frequency offset-compensated mixer signal using said reference clock signal and said estimated frequency offset;

a mixer configured to down convert said incoming OFDMA signal with respect to frequency using said frequency offset-compensated mixer signal to produce a down-converted signal;

an analog-to-digital converter configured to convert said down-converted signal into a digital down-converted signal using said reference clock signal for sampling, said digital down-converted signal including sampling errors due to said reference clock signal; and a digital frequency offset corrector configured to correct said sampling errors in said digital down-converted signal using said estimated frequency offset, wherein said frequency offset estimator is configured to compute the angle of a self-correlation z value to compute said estimated phase difference, said frequency offset estimator being configured to compute said z value using the following equation, $$z = \sum_{i=0}^{N-1} y_{i+N} \cdot y_i^*,$$

where N is the number of signal values in said different slots of said preamble, $y_{i+N}$ is a signal value in one of said different slots of said preamble and $y_i^*$ is the conjugate of a signal value in another slot of said preamble.

16. The device of claim 15 wherein said another slot is the first slot of said preamble of said incoming OFDMA signal and said one of said different slots is the second or third slot of said preamble of said incoming OFDMA signal.

17. An Orthogonal Frequency Division Multiple Access (OFDMA) device comprising:

a local oscillator configured to produce a reference clock signal;

a frequency offset estimator configured to compute an estimated frequency offset based on an incoming OFDMA signal, wherein said frequency offset estimator is configured to compute an estimated phase difference between signal values in different slots of a preamble of said incoming OFDMA signal and to derive said estimated frequency offset using said estimate phase difference in a phase difference equation, said phase difference equation defining a relationship between said estimated phase difference and said estimated frequency offset;

a synthesizer configured to produce a frequency offset-compensated mixer signal using said reference clock signal and said estimated frequency offset;

a mixer configured to down convert said incoming OFDMA signal with respect to frequency using said frequency offset-compensated mixer signal to produce a down-converted signal;

an analog-to-digital converter configured to convert said down-converted signal into a digital down-converted signal using said reference clock signal for sampling, said digital down-converted signal including sampling errors due to said reference clock signal; and a digital frequency offset corrector configured to correct said sampling errors in said digital down-converted signal using said estimated frequency offset, wherein said phase difference equation used by said frequency offset estimator to derive said estimated frequency offset is:

$$\phi = A\pi f_o T_S,$$

where A is a constant, $\phi$ is said estimated phase difference, $f_o$ is said estimated frequency offset and $T_S$ is the preamble period.

18. An Orthogonal Frequency Division Multiple Access (OFDMA) device comprising:

a local oscillator configured to produce a reference clock signal;

a frequency offset estimator configured to compute an estimated frequency offset based on an incoming OFDMA signal;

a synthesizer configured to produce a frequency offset-compensated mixer signal using said reference clock signal and said estimated frequency offset;

a mixer configured to down convert said incoming OFDMA signal with respect to frequency using said frequency offset-compensated mixer signal to produce a down-converted signal;

an analog-to-digital converter configured to convert said down-converted signal into a digital down-converted signal using said reference clock signal for sampling, said digital down-converted signal including sampling errors due to said reference clock signal; and a digital frequency offset corrector configured to correct said sampling errors in said digital down-converted signal using said estimated frequency offset, wherein said frequency offset estimator is configured to compute the angle of a first self-correlation value for the first slot and the second slot of a preamble of said incoming OFDMA signal to derive a first estimated phase difference and to compute the angle of a second self-correlation value for said first slot and the third slot of said preamble to derive a second estimated phase difference, the frequency offset estimator being further configured to derive said estimated frequency offset using said first and second estimated phase differences in at least one phase difference equation, said phase difference equation defining a relationship between at least one of said first and second estimated phase differences and said estimated frequency offset.

19. An Orthogonal Frequency Division Multiple Access (OFDMA) device comprising:

a local oscillator configured to produce a reference clock signal;

a frequency offset estimator configured to compute an estimated frequency offset based on an incoming OFDMA signal;

a synthesizer configured to produce a frequency offset-compensated mixer signal using said reference clock signal and said estimated frequency offset;

a mixer configured to down convert said incoming OFDMA signal with respect to frequency using said frequency offset-compensated mixer signal to produce a down-converted signal;

an analog-to-digital converter configured to convert said down-converted signal into a digital down-converted signal using said reference clock signal for sampling, said digital down-converted signal including sampling errors due to said reference clock signal; and a digital frequency offset corrector configured to correct said sampling errors in said digital down-converted signal using said estimated frequency offset, wherein said frequency offset estimator is configured to compute a first self-correlation value for the first slot and the second slot of a preamble of said incoming OFDMA signal and to compute a second self-correlation value for said first slot and the third slot of said preamble, said frequency offset estimator being further configured to compute the product of said first and second self-correlation values and to compute the angle of said product of said first and second self-correlation values to derive an estimated phase difference, said frequency offset estimator being further configured to derive said estimated frequency offset using said estimated phase difference in a phase difference equation, said phase difference equation defining a relationship between said estimated phase difference and said estimated frequency offset.

20. An Orthogonal Frequency Division Multiple Access (OFDMA) device comprising:

a local oscillator configured to produce a reference clock signal;

a frequency offset estimator configured to compute an estimated frequency offset based on an incoming OFDMA signal;

a synthesizer configured to produce a frequency offset-compensated mixer signal using said reference clock signal and said estimated frequency offset;

a mixer configured to down convert said incoming OFDMA signal with respect to frequency using said frequency offset-compensated mixer signal to produce a down-converted signal;

an analog-to-digital converter configured to convert said down-converted signal into a digital down-converted signal using said reference clock signal for sampling, said digital down-converted signal including sampling errors due to said reference clock signal; and a digital frequency offset corrector configured to correct said sampling errors in said digital down-converted signal using said estimated frequency offset, wherein said frequency offset estimator is configured to cross-correlate a preamble of said incoming OFDMA signal with a reference preamble at different offset shifts to produce cross-correlated signals, said frequency offset estimator being further configured to self-correlate each of said cross-correlated signals to derive self-correlation values and to select an offset shift that correspond to the largest value of said self-correlation values to derive an estimated coarse frequency offset of said estimated frequency offset.

21. An Orthogonal Frequency Division Multiple Access (OFDMA) device comprising:

a local oscillator configured to produce a reference clock signal;

a frequency offset estimator configured to compute an estimated frequency offset based on an incoming OFDMA signal;

a synthesizer configured to produce a frequency offset-compensated mixer signal using said reference clock signal and said estimated frequency offset;

a mixer configured to down convert said incoming OFDMA signal with respect to frequency using said frequency offset-compensated mixer signal to produce a down-converted signal;

an analog-to-digital converter configured to convert said down-converted signal into a digital down-converted signal using said reference clock signal for sampling, said digital down-converted signal including sampling errors due to said reference clock signal;

a digital frequency offset corrector configured to correct said sampling errors in said digital down-converted signal using said estimated frequency offset;

a transmit digital frequency offset corrector connected to receive a digital outgoing signal, said transmit digital frequency offset corrector being configured to digitally correct said digital outgoing signal using said estimated frequency offset in anticipation of digital-to-analog sampling errors;

a digital-to-analog converter configured to convert said digital outgoing signal into an analog outgoing signal using said reference clock signal for sampling; and a transmit mixer configured to up convert said analog outgoing signal with respect to frequency using said frequency offset-compensated mixer signal or a different frequency offset-compensated mixer signal to produce an up-converted outgoing signal.

22. The device of claim 21 wherein said transmit digital frequency offset corrector is configured to digitally resample said digital outgoing signal at a frequency offset-compensated sampling rate derived using said estimated frequency offset.

23. A method of correcting frequency offset in Orthogonal Frequency Division Multiple Access (OFDMA) signals, said method comprising:

receiving an incoming OFDMA signal at said OFDMA device;

computing an estimated phase difference between signal values in different slots of a preamble of said incoming OFDMA signal at said OFDMA device;

deriving an estimated frequency offset using said estimated phase difference in a phase difference equation, said phase difference equation defining a relationship between said estimated phase difference and said estimated frequency offset at said OFDMA device; and correcting errors introduced into said incoming OFDMA signal during processing of said incoming OFDMA signal using said estimated frequency offset at said OFDMA device, wherein said computing said estimated phase difference includes:

computing a self-correlation z value using the following equation:

$$z = \sum_{i=0}^{N-1} y_{i+N} \cdot y_i^*,$$

where N is the number of signal values in said different slots of said preamble, $y_{i+N}$ is a signal value in one of said different slots of said preamble and $y_i^*$ is the conjugate of a signal value in another slot of said preamble; and computing the angle of said z value to derive said estimated phase difference.

24. A method of correcting frequency offset in Orthogonal Frequency Division Multiple Access (OFDMA) signals, said method comprising:

receiving an incoming OFDMA signal at said OFDMA device;

computing an estimated phase difference between signal values in different slots of a preamble of said incoming OFDMA signal at said OFDMA device;

deriving an estimated frequency offset using said estimated phase difference in a phase difference equation, said phase difference equation defining a relationship between said estimated phase difference and said estimated frequency offset at said OFDMA device; and correcting errors introduced into said incoming OFDMA signal during processing of said incoming OFDMA signal using said estimated frequency offset at said OFDMA device, wherein said phase difference equation to derive said estimated frequency offset is:

$$\phi = A\pi f_o T_S,$$

where A is a constant, $\phi$ is said estimated phase difference, $f_o$ is said estimated frequency offset and $T_S$ is the preamble period.

25. A method of correcting frequency offset in Orthogonal Frequency Division Multiple Access (OFDMA) signals, said method comprising:

receiving an incoming OFDMA signal at said OFDMA device;

computing an estimated phase difference between signal values in different slots of a preamble of said incoming OFDMA signal at said OFDMA device;

deriving an estimated frequency offset using said estimated phase difference in a phase difference equation, said phase difference equation defining a relationship between said estimated phase difference and said estimated frequency offset at said OFDMA device;

correcting errors introduced into said incoming OFDMA signal during processing of said incoming OFDMA signal using said estimated frequency offset at said OFDMA device; and computing another estimated phase difference between different signal values in said different slots of said preamble, wherein said deriving said estimated frequency offset includes deriving said estimated frequency offset using said another estimated phase difference in another phase difference equation, said another phase difference equation defining a relationship between said another estimated phase difference and said estimated frequency offset.

26. The method of claim 25 wherein said computing said estimated phase difference includes computing the angle of a first self-correlation value for the first slot and the second slot of said preamble to derive said estimated phase difference, and wherein said computing said another estimated phase difference includes computing the angle of a second self-correlation value for said first slot and the third slot of said preamble to derive said another estimated phase difference.

27. A method of correcting frequency offset in Orthogonal Frequency Division Multiple Access (OFDMA) signals, said method comprising:

receiving an incoming OFDMA signal at said OFDMA device;

computing an estimated phase difference between signal values in different slots of a preamble of said incoming OFDMA signal at said OFDMA device;

deriving an estimated frequency offset using said estimated phase difference in a phase difference equation, said phase difference equation defining a relationship between said estimated phase difference and said estimated frequency offset at said OFDMA device; and correcting errors introduced into said incoming OFDMA signal during processing of said incoming OFDMA signal using said estimated frequency offset at said OFDMA device, wherein said computing said estimated phase difference includes:

computing a first self-correlation value for the first slot and the second slot of a preamble of said incoming OFDMA signal;

computing a second self-correlation value for said first slot and the third slot of said preamble; and computing the product of said first and second self-correlation values to derive said estimated phase difference.

28. A method of correcting frequency offset in Orthogonal Frequency Division Multiple Access (OFDMA) signals, said method comprising:

receiving an incoming OFDMA signal at said OFDMA device;

computing an estimated phase difference between signal values in different slots of a preamble of said incoming OFDMA signal at said OFDMA device;

deriving an estimated frequency offset using said estimated phase difference in a phase difference equation, said phase difference equation defining a relationship between said estimated phase difference and said estimated frequency offset at said OFDMA device;
correcting errors introduced into said incoming OFDMA signal during processing of said incoming OFDMA signal using said estimated frequency offset at said OFDMA device,
cross-correlating said preamble of said incoming OFDMA signal with a reference preamble at different offset shifts to produce cross-correlated signals;
self-correlating each of said cross-correlated signals to derive self-correlation values; and
selecting an offset shift that correspond to the largest value of said self-correlation values to derive an estimated coarse frequency offset of said estimated frequency offset.

* * * * *